US007908341B2

(12) United States Patent
Kwon

(10) Patent No.: US 7,908,341 B2
(45) Date of Patent: Mar. 15, 2011

(54) DIGITAL BROADCASTING RECEIVER HAVING DESTINATION ARRIVAL INFORMATION NOTIFICATION FUNCTION AND NOTIFICATION METHOD USING THE SAME

(75) Inventor: Seong Geun Kwon, Metropolitan (KR)

(73) Assignee: Samsung Electronics Co., Ltd (KR)

( * ) Notice: Subject to any disclaimer, the term of this patent is extended or adjusted under 35 U.S.C. 154(b) by 958 days.

(21) Appl. No.: 11/807,854

(22) Filed: May 30, 2007

(65) Prior Publication Data

US 2007/0291878 A1 Dec. 20, 2007

(30) Foreign Application Priority Data

Jun. 19, 2006 (KR) ........................ 10-2006-0054950

(51) Int. Cl.
*G06F 15/16* (2006.01)

(52) U.S. Cl. ......... 709/217; 709/203; 709/231; 709/232; 709/236; 709/237; 709/246; 701/9; 701/23; 701/200; 701/204; 701/302

(58) Field of Classification Search .................. 709/203, 709/207, 217, 231, 232, 236, 237, 246; 701/9, 701/23, 200, 204, 302
See application file for complete search history.

(56) References Cited

U.S. PATENT DOCUMENTS 6,230,097 B1 * 5/2001 Dance et al. .................. 701/207
7,152,106 B2 * 12/2006 Cohen et al. .................. 709/224
2007/0291878 A1 * 12/2007 Kwon ........................... 375/316
2008/0208680 A1 * 8/2008 Cho ................................ 705/13

* cited by examiner

*Primary Examiner* — Michael Won
(74) *Attorney, Agent, or Firm* — The Farrell Law Firm, P.C.

(57) ABSTRACT

A digital broadcasting receiver includes a gap filler information storage unit for storing information of locations of gap fillers and information of corresponding gap filler identifiers matched to the locations. The gap fillers are arranged at regular intervals in order to relay digital broadcasting data transmitted from a satellite. A reception unit receives the digital broadcasting data including the information of gap filler identifiers. A sub-controller detects identification information of a current gap filler from the digital broadcasting data. An input unit receives an input of destination information. A main controller detects identification information of a destination gap filler corresponding to the input destination information from the gap filler information storage unit, counts the number of gap fillers located between the destination gap filler and the current gap filler, and generates destination arrival information based on the counted number of gap fillers. An output unit outputs destination arrival information under control of the main controller.

14 Claims, 7 Drawing Sheets

FIG . 4A

430a

| SERIAL NO (431a) | • • • | 3 | 4 | 5 | 6 | 7 | 8 | 9 | 10 | • • • |
|---|---|---|---|---|---|---|---|---|---|---|
| SUBWAY STATION NAME (433a) | • • • | KANGNAM | ƀ | YEOKSAM | ƀ | ƀ | ƀ | SEONLEUNG | ƀ | • • • |
| GAP FILLER ID (435a) | • • • | 5 | 100 | 120 | 70 | 16 | 30 | 150 | 210 | • • • |

FIG . 4B

430b

| SERIAL NO (431b) | • • • | 3 | 4 | 5 | 6 | 7 | 8 | 9 | 10 | • • • |
|---|---|---|---|---|---|---|---|---|---|---|
| ACCESS/EXIT LOCAL AREA NAME (433b) | • • • | SUWON | ƀ | ƀ | KIHEUNG | ƀ | ƀ | ƀ | OSAN | • • • |
| GAP FILLER ID (435b) | • • • | 5 | 100 | 120 | 70 | 16 | 30 | 150 | 210 | • • • |

DIGITAL BROADCASTING RECEIVER HAVING DESTINATION ARRIVAL INFORMATION NOTIFICATION FUNCTION AND NOTIFICATION METHOD USING THE SAME

PRIORITY

This application claims priority to an application entitled "DIGITAL BROADCASTING RECEIVER HAVING DESTINATION ARRIVAL INFORMATION NOTIFICATION FUNCTION AND NOTIFICATION METHOD USING THE SAME" filed in the Korean Intellectual Property Office on Jun. 19, 2006 and assigned Serial No. 2006-0054950, the contents of which are hereby incorporated by reference.

BACKGROUND OF THE INVENTION

1. Field of the Invention

The present invention relates generally to a digital broadcasting receiver and, more particularly, to a DMB receiver and a method using the same.

2. Description of the Related Art

With advances in communication technologies and the wide spread use of mobile communication terminals (such as mobile phones, Personal Digital Assistants (PDAs), notebook computers, etc.), mobile communication terminals are being developed to have a wider variety of functions. For example, in the case of the mobile phones, the initial mobile phones could only support voice communication. However, the mobile phones have been gradually developed and can now support character transmission, image transmission, etc.

With development of technology memories capable of storing large-capacity digital broadcasting (such as moving images, music video, etc.) and the wide spread use of mobile communication terminals, mobile communication terminals capable of receiving digital broadcasting data (such as DMB phones) have been recently developed and commercialized.

Digital broadcasting refers to a broadcasting service for modulating various multimedia signals including voice, images, etc. into digital signals and then providing the modulated digital signals. Through the use of DMB, a user, even in motion, can receive various types of multimedia broadcasting through a receiver for an automobile or a personal portable receiver, which is provided with a non-directional reception antenna.

Users can view digital broadcasting by using a digital broadcasting receiving phone even while they move. Users can also view digital broadcasting by using a digital broadcasting receiving phone, even while they ride in a subway train or on a bus.

However, when a user views DMB while the user moves by means of public transportation such as a subway train or a bus, the user may be too deeply fascinated with the DMB and may pass by his/her destination. That is, a user in motion may be too deeply fascinated with the DMB and may forget his/her current location.

SUMMARY OF THE INVENTION

The present invention has been made in view of the above problems, and an object of the present invention is to provide a digital broadcasting receiver and a notification method using the same, which can generate and provide a notification of destination arrival information while receiving digital broadcasting.

Another object of the present invention is to provide a digital broadcasting receiver and a notification method using the same, which can calculate and provide a notification of expected arrival time by using digital broadcasting reception data.

Still another object of the present invention is to provide a digital broadcasting receiver and a notification method using the same, which can provide a notification of a temporal/spatial distance from the destination by using digital broadcasting reception data.

In accordance with an exemplary embodiment of the present invention, there is provided a digital broadcasting receiver including: a gap filler information storage unit for storing information of locations of gap fillers and information of corresponding gap filler identifiers matched to the locations, wherein the gap fillers are arranged at regular intervals; a reception unit for receiving data including the information of gap filler identifiers; a sub-controller for detecting identification information of a current gap filler from the data; an input unit for receiving the input of destination information; a main controller for detecting identification information of a destination gap filler corresponding to the input destination information from the gap filler information storage unit, counting the number of gap fillers located between the destination gap filler and the current gap filler, and generating destination arrival information based on the counted number of gap fillers; and an output unit for outputting destination arrival information under control of the main controller.

Preferably, the main controller stores a reference number of gap fillers for arrival, compares the counted number of gap fillers with the reference number of gap fillers, and generates destination arrival information for an arrival to the destination when the counted number of gap fillers does not exceed the reference number of gap fillers.

More preferably, the main controller calculates the number of bus stops or subway stations remaining before the destination or passed by after the destination by using the counted number of the gap fillers, and generates the number of remaining bus stops or remaining subway stations as the destination arrival information when the number of remaining/passed bus stops or remaining/passed subway stations is less than or more than the reference number for the arrival.

Further, the main controller may calculate a remaining distance to the destination or an exceeding distance beyond the destination by using the counted number of gap fillers and the regular interval between the gap fillers, and generate the remaining distance or the exceeding distance as the destination arrival information.

In accordance with another exemplary embodiment of the present invention, there is provided a method of notifying destination arrival information by a digital broadcasting receiver storing information of locations of gap fillers and information of corresponding gap filler identifiers matched to the locations, wherein the gap fillers are arranged at regular intervals, the method including: inputting a destination; detecting identification information of a destination gap filler corresponding to the input destination; receiving data including the identification information of the destination gap filler corresponding to the input destination; detecting identification information of a current gap filler from the data; counting the number of gap fillers located between the destination gap filler and the current gap filler by using the identification information of the destination gap filler and the identification information of the current gap filler; and outputting the destination arrival information based on the counted the number of gap fillers.

Preferably, in outputting the destination arrival information, the counted number of gap fillers is compared with a reference number of gap fillers for arrival, and arrival at the destination or passage of the destination is provided in advance when the counted number of gap fillers is less than or more than the reference number of gap fillers.

More preferably, the outputting of the destination arrival information includes: calculating the number of bus stops or subway stations remaining before the destination or passed by after the destination by using the counted number of the gap fillers; and outputting the number of remaining/passed bus stops or remaining/passed subway stations as the destination arrival information when the number of remaining/passed bus stops or remaining/passed subway stations is less than or more than the reference number for the arrival.

Further, the outputting of the destination arrival information may include: calculating estimated necessary time in order to reach the destination by using the counted number of gap fillers and the regular interval between the gap fillers; comparing the estimated necessary time with predetermined arrival notice time; and outputting the estimated necessary time as the destination arrival information when the estimated necessary time does not exceed the predetermined arrival notice time.

BRIEF DESCRIPTION OF THE DRAWINGS

The above and other objects, features and advantages of the present invention will be more apparent from the following detailed description in conjunction with the accompanying drawings, in which:

FIGS. 4A and 4B illustrate examples of the configuration of a gap filler information management DB for managing information necessary for a destination arrival information notification function according to an embodiment of the present invention;

DETAILED DESCRIPTION OF PREFERRED EMBODIMENTS

Figure 1:
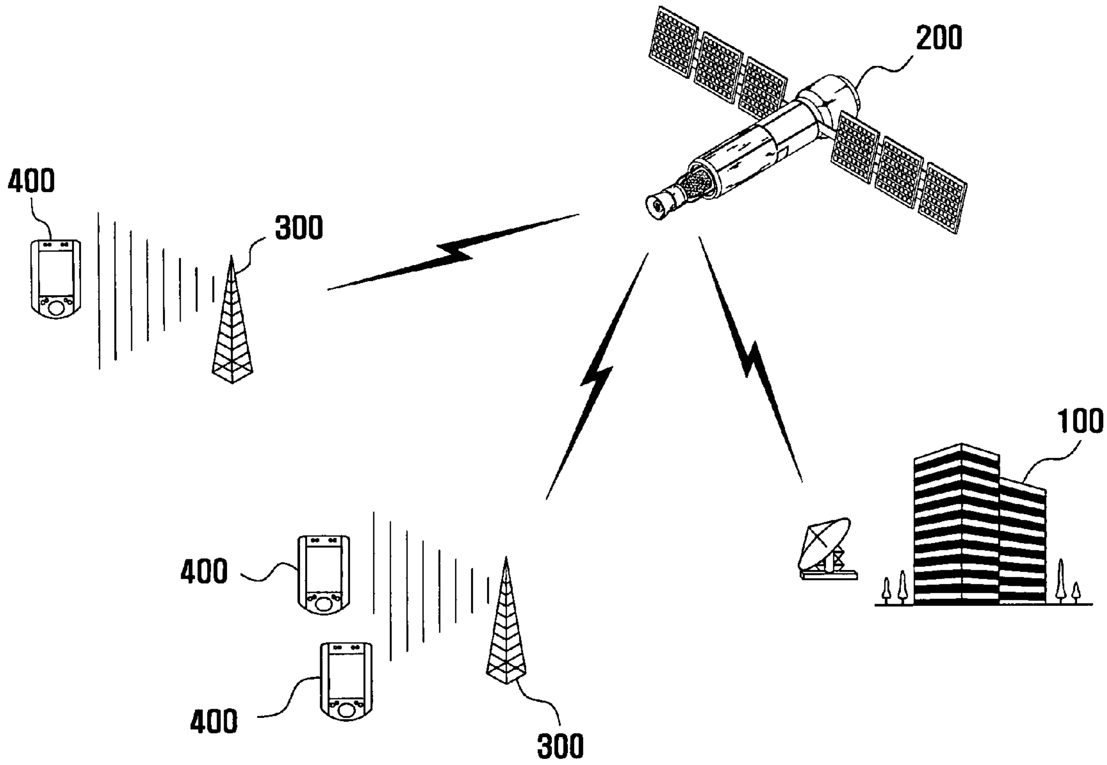
FIG. 1 illustrates a configuration of a Digital Broadcasting system according to the present invention.

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

FIG. 1 illustrates a configuration of a digital broadcasting system according to an exemplary embodiment of the present invention. FIG. 1 illustrates the configuration of a satellite digital broadcasting service system. Referring to FIG. 1, the satellite digital broadcasting service system includes a broadcasting station 100, a digital broadcasting satellite 200, gap fillers 300, and digital broadcasting receivers 400.

The broadcasting station 100 generates various broadcasting signals (typically at 14 GHz), such as moving images, music video, and drama, and transmits the generated broadcasting signals to the digital broadcasting satellite 200.

The digital broadcasting satellite 200 receives the broadcasting signals (typically at 14 GHz) transmitted from the broadcasting station 100 and transmits broadcasting signals within a 2.6 GHz band or 14 GHz band to the ground.

Each of the gap fillers 300 receives broadcasting signals in the 14 GHz band from the digital broadcasting satellite 200 and outputs broadcasting signals in the 2.6 GHz band. At this time, the gap filler 300 inserts a gap filler identifier (GFID) in a particular area of a broadcasting signal (for example, a pilot channel) received from the digital broadcasting satellite 200 and outputs a broadcasting signal including the GFID. The GFID corresponds to specific information of each gap filler, and all gap fillers have different GFIDs.

Each of the digital broadcasting receivers 400 receives a broadcasting signal in the 2.6 GHz band from the digital broadcasting receiver 200 or the gap filler 300. By using the GFID included in the received broadcasting signal from the gap filler 300, the digital broadcasting receiver 400 provides a notification of destination arrival information (for example, expected arrival time or temporal/spatial distance from the destination) while receiving digital broadcasting.

The digital broadcasting receiver 400 preferably stores location information of each of the gap fillers, which are arranged at a predetermined interval in order to relay digital broadcasting data transmitted from the satellite, in connection with gap filler ID information of the corresponding gap filler. Further, it is preferred that the digital broadcasting receiver 400 is included in a mobile communication terminal, such as a mobile phone or a Personal Digital Assistant (PDA). A brief construction of the digital broadcasting receiver 400 is illustrated in FIG. 2.

Figure 2:
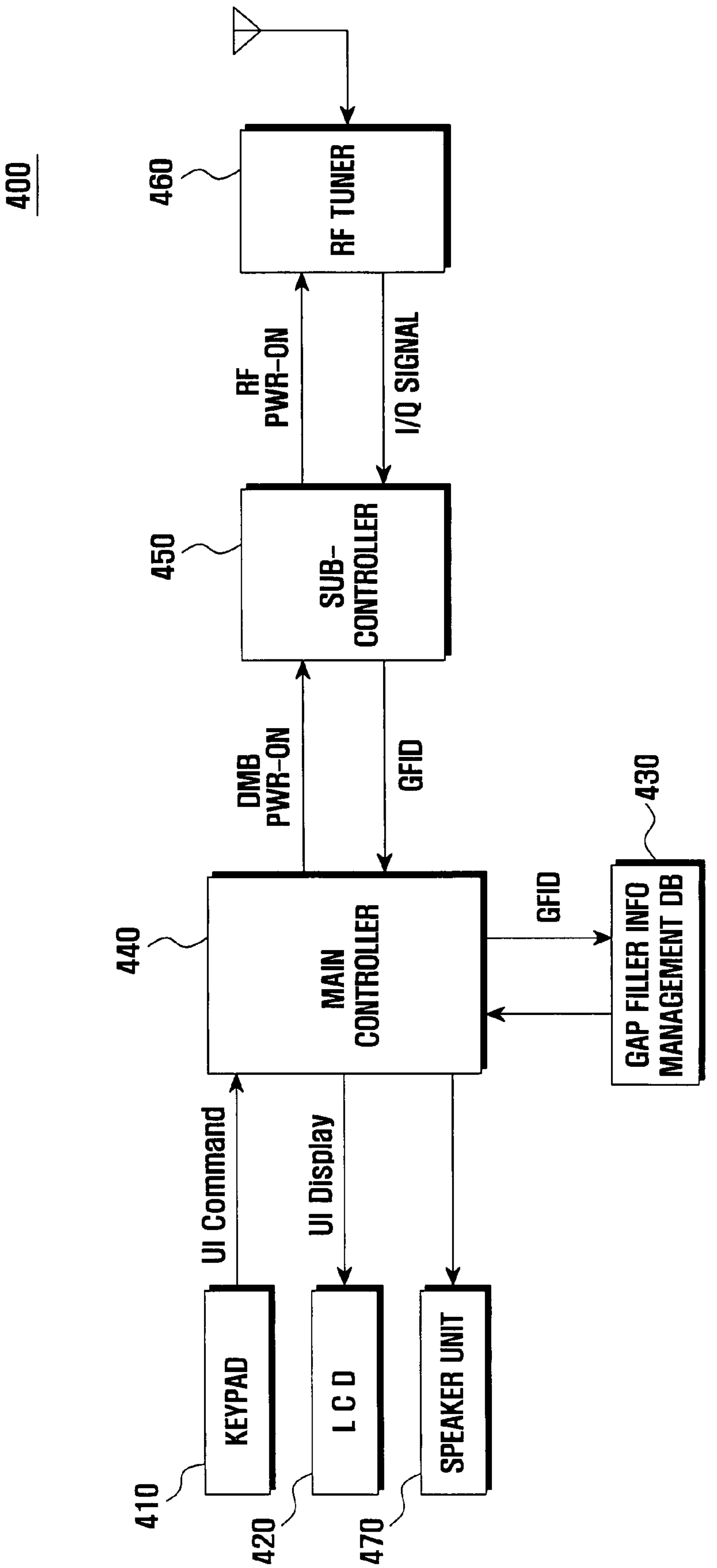
FIG. 2 is a block diagram of a digital broadcasting receiver according to an embodiment of the present invention.

FIG. 2 is a block diagram of a digital broadcasting receiver according to an embodiment of the present invention. Referring to FIG. 2, the digital broadcasting receiver 400 according to an embodiment of the present invention includes a keypad 410, a Liquid Crystal Display (LCD) 420, a gap filler information management database (DB) 430, a main controller 440, a sub-controller 450, a Radio Frequency (RF) tuner 460, and a speaker unit 470.

The keypad 410 receives from a user an operation signal (UI command) for controlling the digital broadcasting receiver 400, and transfers the UI command to the main controller 440. The keypad 410 receives destination information from a user who is moving or scheduled to move, and transfers the destination information to the main controller 440.

Under the control of the main controller 440, the LCD 420 displays various information in relation to the operation of the digital broadcasting receiver 400. Under the control of the main controller 440, the LCD 420 displays digital broadcasting data received through the RF tuner 460. The LCD 420 displays destination arrival information (for example, expected arrival time or temporal/spatial distance from the destination).

The gap filler information management DB 430 stores information about locations of the gap fillers. The gap filler information management DB 430 preferably stores location information of each of the gap fillers, which are arranged at a predetermined interval in order to relay digital broadcasting data transmitted from the satellite, in connection with gap filler ID information of the corresponding gap filler.

Examples of the configuration of the gap filler information management DB 430 as described above are illustrated in FIGS. 4A and 4B, and will be described later with reference to FIGS. 4A and 4B.

The main controller 440 controls the operation of the digital broadcasting receiver 400. The main controller 440 controls the operation of the digital broadcasting receiver 400 by using a pre-stored control algorithm or a UI command input through the keypad 410. The main controller 440 controls the power of the sub-controller 450 based on user request information input through the keypad 410.

Further, the main controller 440 detects destination gap filler ID information corresponding to the destination information input through the keypad 410 from the gap filler information management DB 430, receives current gap filler ID information included in the digital broadcasting data received through the RF tuner 460 from the sub-controller 450, and counts the number of gap fillers located between the destination gap filler and the current gap filler. The gap filler information management DB 430 preferably manages the gap fillers by allocating a serial number to each of the gap fillers, and determines the number of gap fillers located between the destination and the current position by using a difference between the serial numbers of the gap fillers of the destination and the current position. Then, based on the number of gap fillers located between the destination and the current position, the main controller 440 generates destination arrival information (for example, expected arrival time or temporal/spatial distance from the destination).

If the main controller 440 wants to provide the spatial distance from the destination as the destination arrival information, the main controller 440 stores a reference number for an arrival. The main controller 440 compares the counted number of gap fillers with the predetermined reference number for the arrival. When the counted number of gap fillers does not exceed the reference number for the arrival, the main controller 440 generates destination arrival information for the arrival. For example, the main controller 440 may calculate the number of bus stops or subway stations remaining before the destination by using the counted gap fillers, and may generate the number of remaining bus stops or subway stations as the destination arrival information when the number of remaining/passed bus stops or subway stations is less than or more than the reference number for the arrival. When the reference number of stops for the arrival is "2" and the number of remaining stops is also "2," the main controller 440 may output a guide message such as, "Expected arrival at the destination after two stops."

If the main controller 440 wants to provide the temporal distance from the destination as the destination arrival information, the main controller 440 stores predetermined arrival notice time. Further, based on the counted number of gap fillers and the interval between the gap fillers, the main controller 440 calculates estimated necessary time required to reach the destination. When the estimated necessary time does not exceed the predetermined arrival notice time, the main controller 440 generates destination arrival information for the arrival. For example, the main controller 440 may generate the estimated necessary time as the destination arrival information. When the predetermined arrival notice time is "10 minutes" and the estimated necessary time is "9 minutes," the main controller 440 may output a guide message such as, "Expected arrival at the destination after nine minutes."

Further, if the main controller 440 wants to provide expected arrival time as the destination arrival information, the main controller 440 calculates the estimated necessary time required to reach the destination based on the counted number of gap fillers and the interval between the gap fillers. Then, the main controller 440 calculates the expected arrival time based on the estimated necessary time, and generates the expected arrival time as the destination arrival information.

In order to obtain the estimated necessary time, the main controller 440 calculates the distance up to the destination by multiplying the counted number of gap fillers by the interval between the gap fillers, detects the moving speed of the digital broadcasting receiver 400, and calculates the estimated necessary time by using the calculated distance and the detected moving speed.

The sub-controller 450 (also known as a digital broadcasting receiving chip) starts to operate in response to a digital broadcasting power control signal (DMB PWR-ON) transmitted from the main controller 440, and turns on the RF tuner 460 for receiving digital broadcasting data. The sub-controller 450 transmits an RF power control signal (RF PWR-ON) to the RF tuner 460. Upon receiving an I/Q signal including digital broadcasting data from the RF tuner 460, the sub-controller 450 detects a gap filler ID (GFID) from the I/Q signal and transfers the detected gap filler ID (GFID) to the main controller 440. From a pilot channel received through the RF tuner 460, the sub-controller 450 detects gap filler ID information (i.e. gap filler ID) of a gap filler transmitted the pilot channel, and transfers the detected gap filler ID to the main controller 440. It is preferred that the sub-controller 450 stores the gap filler ID (GFID) field (i.e. storage location of the GFID) information in the pilot channel and detects the GFID information by using the GFID field information.

The RF tuner 460 starts to operate in response to an RF tuner power control signal (RF PWR-ON) transmitted from the sub-controller 450, receives digital broadcasting data, and transfers the received digital broadcasting data to the sub-controller 450. The received digital broadcasting data includes identification information relaying digital broadcasting data transmitted from a satellite.

It is preferred that a digital broadcasting receiver according to the present invention as described above is mounted in either a mobile phone or a PDA.

Figure 3:
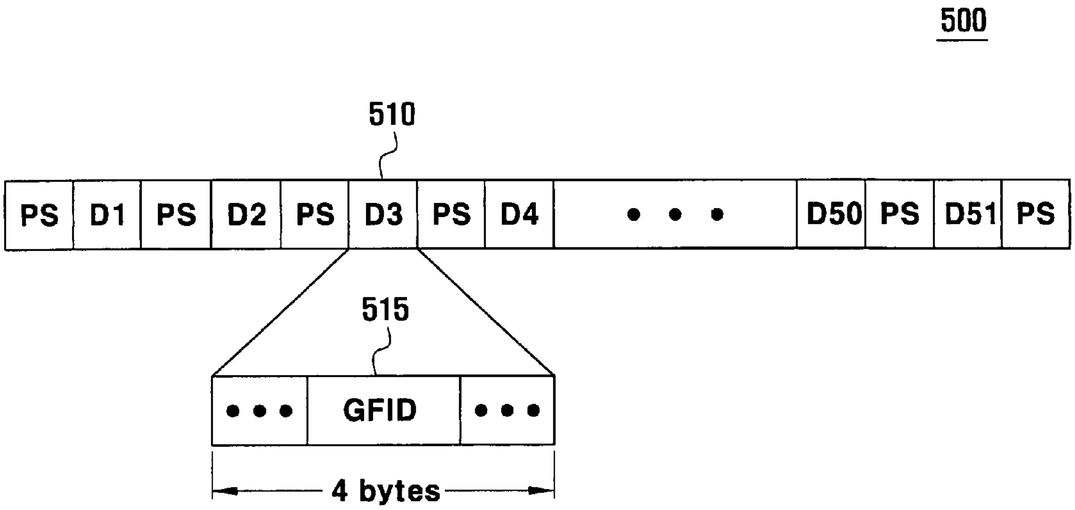
FIG. 3 illustrates an example of a format of digital broadcasting data transmitted to a digital broadcasting receiver according to an embodiment of the present invention.

FIG. 3 illustrates an example of a format of digital broadcasting data transmitted to a digital broadcasting receiver according to an embodiment of the present invention. Referring to FIG. 3, the digital broadcasting data 500 includes pilot symbols PS each having a size of 32 bits and satellite broadcasting control data D1 to D51 each having a size of 32 bits, which are arranged in an alternating manner between the pilot signal and the satellite broadcasting control data. In the digital broadcasting data 500, all the pilot symbols have data value of "1," the satellite broadcasting control data D1 indicates a unit word, the satellite broadcasting control data D2 indicates a frame counter, the satellite broadcasting control data D3 to D50 correspond to control data for a broadcasting channel, and the satellite broadcasting control data D51 corresponds to a reserved control data space, which contains no data.

The digital broadcasting data 500 having the configuration as described above stores various control information and channel information by using the divided data fields.

The gap filler stores a gap filler ID (GFID) in a field containing no data from among the data fields, and then transmits the digital broadcasting data 500 to a digital broadcasting receiver. Usually, the gap filler inserts the gap filler ID (GFID) in the upper four bytes of the D3 field 510 from among the data fields of the digital broadcasting data 500 having the configuration described above. Further, the gap filler may insert the gap filler ID (GFID) in the D51 field that contains no data.

In order to detect the gap filler ID (GFID) from the digital broadcasting data 500, it is preferred to pre-store information about the location of a field storing the gap filler ID (GFID) within the digital broadcasting data 500, so that the sub-controller 450 of FIG. 2 can detect the gap filler ID (GFID) in that field (e.g. the field 515).

FIGS. 4A and 4B illustrate examples of databases for managing gap filler information in order to perform a destination arrival information notification function according to an embodiment of the present invention. FIG. 4A illustrates an example of a first database storing names of subway stations corresponding to gap filler IDs, and FIG. 4B illustrates an example of a second database storing names of access/exit location areas corresponding to gap filler IDs Referring to FIGS. 4A and 4B, each gap filler identified by a gap filler ID is assigned a serial number, and each gap filler located at a particular station or a particular access/exit local area is matched to the corresponding station or the corresponding access/exit local area.

Referring to FIG. 4A, the first database includes items of serial number 431*a*, subway station name 433*a*, and gap filler ID 435*a*. In the first database shown in FIG. 4A, the gap filler having a gap filler ID of "5" is matched to the "Gangnam" station, the gap filler having a gap filler ID of "120" is matched to the "Yeoksam" station, and the gap filler having a gap filler ID of "150" is matched to the "Seonleung" station. Further, the gap fillers including the gap filler having a gap filler ID of "100" located between the "Gangnam" station and the "Yeoksam" station, the gap filler having a gap filler ID of "70" located between the "Yeoksam" station and the "Seonleung" station, the gap filler having a gap filler ID of "16," the gap filler having a gap filler ID of "30," and the gap filler having a gap filler ID of "210" located between the "Seonleung" station and the next station, are matched to no station name.

Referring to FIG. 4B, the second database includes items of serial number 431*b*, access/exit local area name 433*b*, and gap filler ID 435*b*. In the second database shown in FIG. 4B, the gap filler having a gap filler ID of "5" is matched to the "Suwon" interchange (IC), the gap filler having a gap filler ID of "70" is matched to the "Kiheung" IC, and the gap filler having a gap filler ID of "210" is matched to the "Osan" IC. Further, the gap fillers including the gap filler having a gap filler ID of "100" located between the "Suwon" IC and the "Kiheung" IC, the gap filler having a gap filler ID of "120," the gap filler having a gap filler ID of "16" located between the "Kiheung" IC and the "Osan" IC, the gap filler having a gap filler ID of "30," and the gap filler having a gap filler ID of "150,", are matched to no station name.

By using such databases, the main controller 440 of FIG. 2 can estimate the temporal/spatial distance from the current position to the destination and the expected arrival time.

Figure 5:
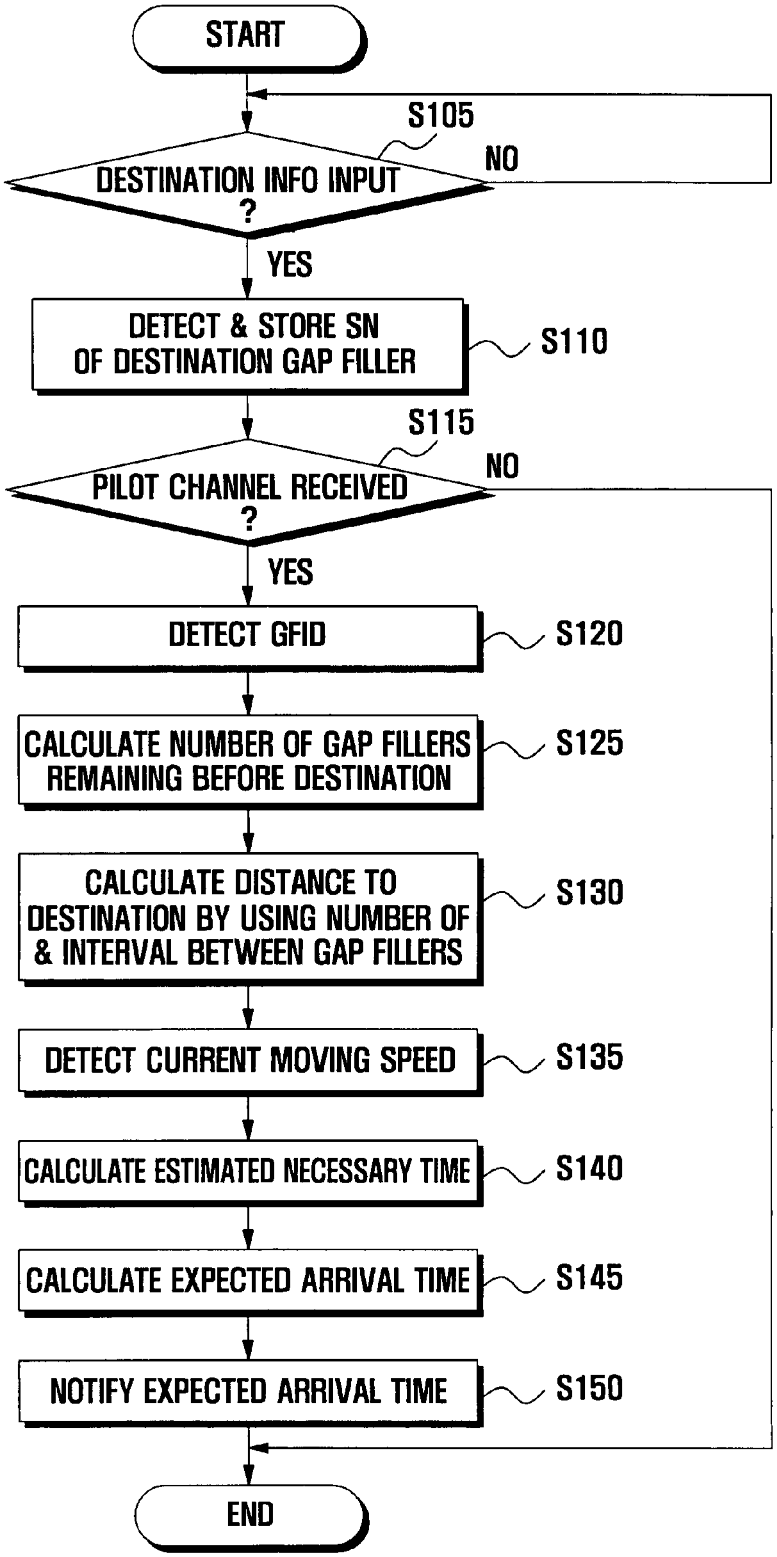
FIG. 5 is a flow diagram illustrating a method of notifying destination arrival information according to a first embodiment of the present invention.

FIG. 5 is a flow diagram illustrating a method of notifying destination arrival information according to a first embodiment of the present invention. Referring to FIGS. 2 and 5, when a destination (for example, subway station, bus stop, highway access/exit IC) is input through the keypad 410 in step S105, the main controller 440 detects destination gap filler ID information and a serial number thereof, which correspond to the input destination, from the gap filler information management DB 430 and stores the detected information in step S110. In this step, the detection and storage of the serial number of the gap filler located at the destination is necessary in order to calculate the estimated necessary time from a current location to the destination by using a difference between the serial number of the gap filler located at the destination and the serial number of the gap filler at the current location.

digital broadcasting data including a pilot channel is received through the RF tuner 460 in step S115, and the sub-controller 450 detects identification information (GFID) of the gap filler transmitted the pilot channel by analyzing the digital broadcasting data in step S120. The sub-controller 450 transfers the result of the detection to the main controller 440.

In steps S215 the main controller 440 calculates the number of gap fillers located between the destination gap filler detected and stored in step S110 and the gap filler detected in step S120. The main controller 440 detects a serial number corresponding to the detected gap filler ID information from the gap filler information management DB 430, and calculates the number of gap fillers between the gap filler detected in step S120 and the pre-stored destination gap filler by comparing serial numbers of them. The main controller 440 determines the number of gap fillers located between the destination and the current location by using a difference between serial numbers of gap fillers at the destination and the current location.

The main controller 440 calculates the distance from the current location to the destination by multiplying the calculated number of gap fillers by the interval between the gap fillers in step S130, detects the moving speed of the digital broadcasting receiver 400 in step S135, and calculates estimated time in order to reach the destination by using the calculated distance and the detected moving speed in step S140. In order to detect the moving speed of the digital broadcasting receiver 400, the main controller 440 may use various methods known in the art.

After obtaining the estimated time as described above, the main controller 440 calculates expected arrival time based on the estimated time in step S145, and provides a notification of the expected arrival time in step S150, that is, outputs the expected arrival time.

Figure 6:
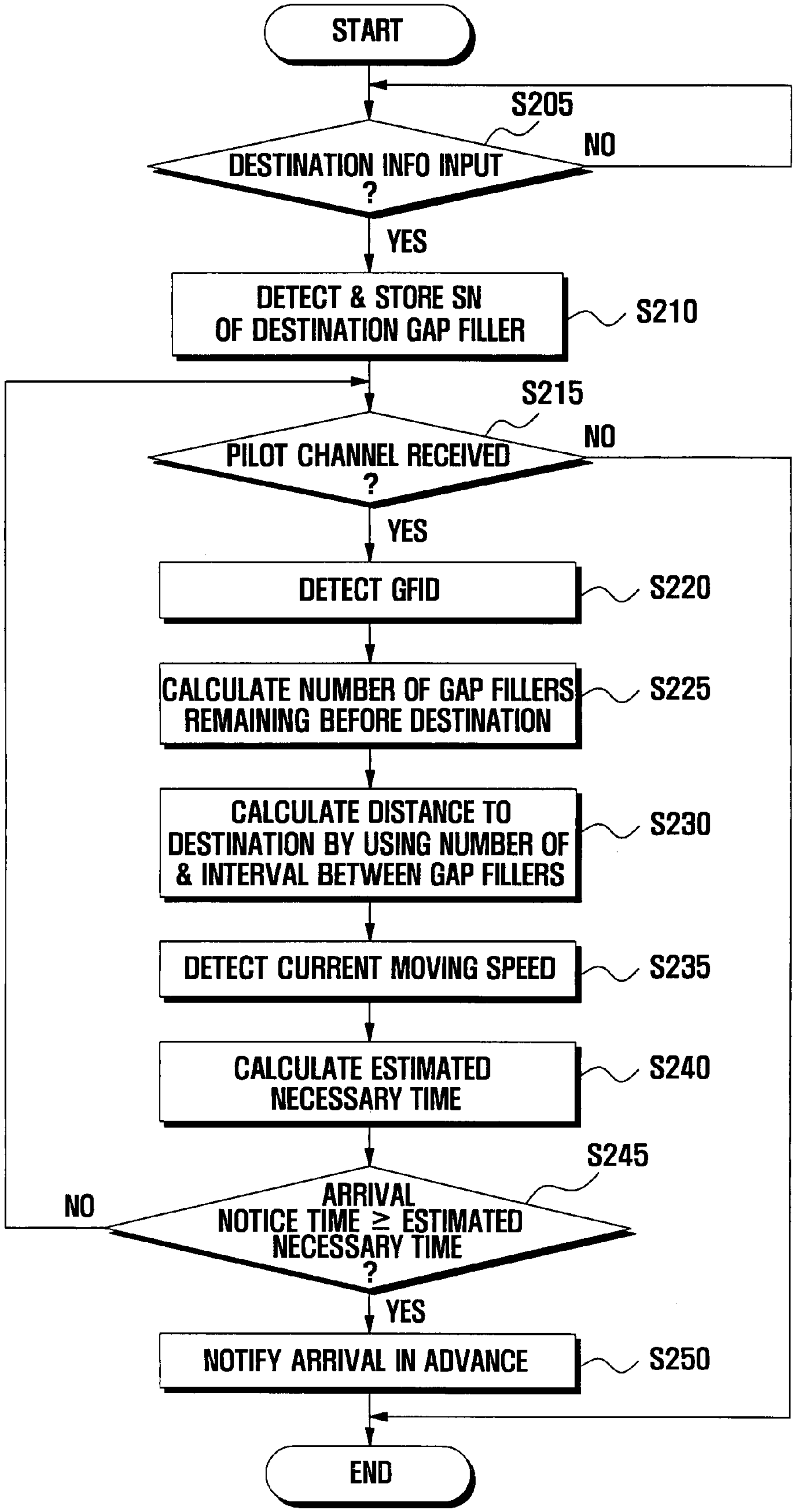
FIG. 6 is a flow diagram illustrating a method for notifying destination arrival information according to a second embodiment of the present invention.

FIG. 6 is a flow diagram illustrating a method for notifying destination arrival information according to a second embodiment of the present invention. Referring to FIGS. 2 and 6, when a destination (for example, subway station, bus stop, highway access/exit IC) is input through the keypad 410 in step S205, the main controller 440 detects destination gap filler ID information and a serial number thereof, which correspond to the destination input in step S205, from the gap filler information management DB 430, and stores the detected information in step S210. In this step, the detection and storage of the serial number of the gap filler located at the destination is necessary in order to calculate the estimated time from a current location to the destination by using a difference between the serial number of the gap filler located at the destination and the serial number of the gap filler at the current location.

digital broadcasting data including a pilot channel is received through the RF tuner 460 in step S215, and the sub-controller 450 detects identification information (GFID) of the gap filler transmitted the pilot channel by analyzing the digital broadcasting data in step S220. The sub-controller 450 transfers the result of the detection to the main controller 440.

In step S225 the main controller 440 calculates the number of gap fillers located between the destination gap filler detected and stored in step S210 and the gap filler detected in step S220. The main controller 440 detects a serial number corresponding to the detected gap filler ID information from the gap filler information management DB 430, and calculates the number of gap fillers between the gap filler detected in step S220 and the pre-stored destination gap filler by comparing their serial numbers. The main controller 440 determines the number of gap fillers located between the destination and the current location by using a difference between serial numbers of gap fillers at the destination and the current location.

The main controller 440 calculates the distance from the current location to the destination by multiplying the calculated number of gap fillers by the interval between the gap fillers in step S230, detects the moving speed of the digital broadcasting receiver 400 in step S235, and calculates estimated necessary time in order to reach the destination by using the calculated distance and the detected moving speed in step S240. In order to detect the moving speed of the digital broadcasting receiver 400, the main controller 440 may use various methods known in the art.

After obtaining the estimated time as described above, the main controller 440 compares the estimated time with predetermined arrival notice time in step S245, and provides a preliminary notification of the arrival to the destination when the estimated time does not exceed the predetermined arrival notice time in step S250. For example, the main controller 440 may generate the estimated necessary time as the destination arrival information and may provide a preliminary notification of the arrival to the destination by using the estimated time. If the predetermined arrival notice time is "10 minutes" and the estimated time is "9 minutes," the main controller 440 may output a guide message saying, "Expected arrival at the destination after nine minutes."

Figure 7:
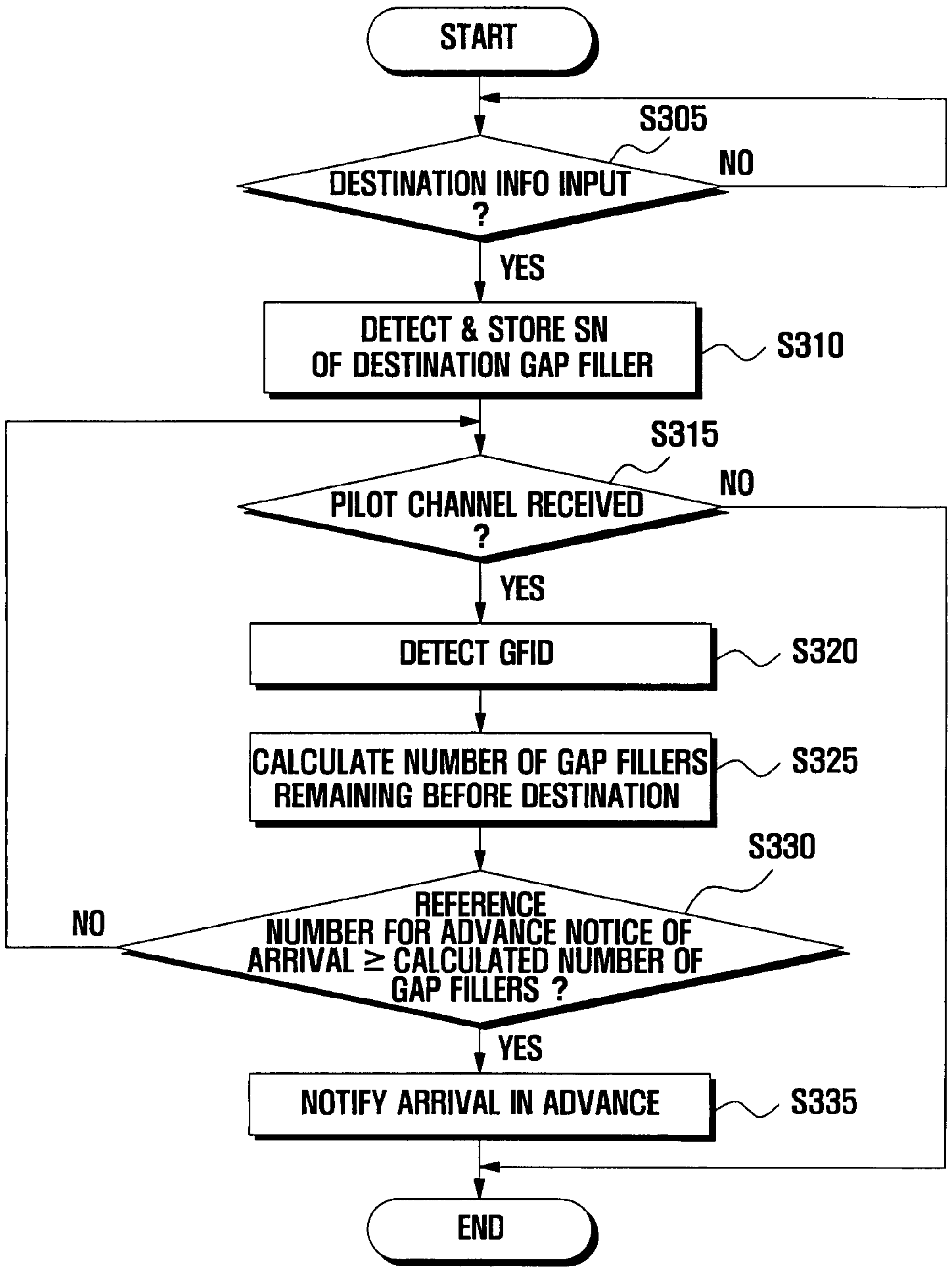
FIG. 7 is a flow diagram illustrating a method for notifying destination arrival information according to a third embodiment of the present invention.

FIG. 7 is a flow diagram illustrating a method for notifying destination arrival information according to a third embodiment of the present invention. Referring to FIGS. 2 and 7, when a destination (for example, subway station, bus stop, highway access/exit IC) is input through the keypad 410 in step S305, the main controller 440 detects destination gap filler ID information and a serial number thereof, which correspond to the destination input in step S305, from the gap filler information management DB 430 and stores the detected information in step S310. The detection and storage of the serial number of the gap filler located at the destination is necessary in order to calculate the number of gap fillers located between the destination and the current location by using a difference between the serial number of the gap filler located at the destination and the serial number of the gap filler at the current location.

Digital broadcasting data including a pilot channel is received through the RF tuner 460 in step S315, and the sub-controller 450 detects identification information (GFID) of the gap filler transmitted the pilot channel by analyzing the digital broadcasting data in step S320. The sub-controller 450 transfers the result of the detection to the main controller 440.

In step S325 the main controller 440 calculates the number of gap fillers located between the destination gap filler detected and stored in step S310 and the gap filler detected in step S320. The main controller 440 detects a serial number corresponding to the detected gap filler ID information from the gap filler information management DB 430, and determines the number of gap fillers between the gap filler detected in step S320 and the pre-stored destination gap filler by comparing serial numbers of them. The main controller 440 determines the number of gap fillers located between the destination and the current location by using a difference between serial numbers of gap fillers at the destination and the current location.

The main controller 440 compares the calculated number of gap fillers between the destination and the current location with a predetermined reference number for the arrival in step S330. The main controller 440 provides a preliminary notification of the arrival to the destination when the calculated number of gap fillers between the destination and the current location does not exceed the predetermined reference number for the arrival in step S335. For example, the main controller 440 calculates the number of bus stops or subway stations remaining before the destination by using the counted number of the gap fillers, and generates the number of remaining bus stops or subway stations as the destination arrival information when the number of remaining bus stops or subway stations does not exceed the predetermined reference number for the arrival. Then, the main controller 440 provides a preliminary notification of the arrival to the destination. When the reference number of stops for an arrival is "2" and the number of remaining stops is also "2," the main controller 440 may output a guide message saying, "Expected arrival at the destination after two stops."

As apparent from the above description, the present invention provides a digital broadcasting receiver and a notification method using the same, which can provide a notification of destination arrival information (for example, expected arrival time or temporal/spatial distance from the destination) while receiving digital broadcasting, so that a user of the digital broadcasting receiver can prepare in advance for the arrival to the destination.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A digital broadcasting receiver, comprising:

a gap filler information storage unit for storing information of locations of gap fillers and information of corresponding gap filler identifiers matched to the locations, wherein the gap fillers are arranged at regular intervals;

a reception unit for receiving data including the information of gap filler identifiers;

a sub-controller for detecting identification information of a current gap filler from the data;

an input unit for receiving the input of destination information;

a main controller for detecting identification information of a destination gap filler corresponding to the input destination information from the gap filler information storage unit, counting the number of gap fillers located between the destination gap filler and the current gap filler, and generating destination arrival information based on the counted number of gap fillers; and an output unit for outputting destination arrival information under control of the main controller.

2. The digital broadcasting receiver of claim 1, wherein the main controller stores a reference number of gap fillers for arrival, compares the counted number of gap fillers with the reference number of gap fillers, and generates destination arrival information for an arrival to the destination when the counted number of gap fillers is less than or more than the reference number of gap fillers.

3. The digital broadcasting receiver of claim 2, wherein the main controller calculates the number of bus stops or subway stations remaining before the destination or passed by after the destination by using the counted number of the gap fillers, and generates the number of remaining or passed bus stops or subway stations as the destination arrival information when the number of remaining/passed bus stops or remaining/passed subway stations is less than or more than the reference number for the arrival.

4. The digital broadcasting receiver of claim 1, wherein the main controller calculates a remaining distance to the destination or an exceeding distance beyond the destination by using the counted number of gap fillers and the regular interval between the gap fillers, and generates the remaining distance or the exceeding distance as the destination arrival information.

5. The digital broadcasting receiver of claim 4, wherein the main controller detects a moving speed of the digital broadcasting receiver, calculates an expected time to reach the destination by using the remaining distance and the detected moving speed, and generates the expected time as the destination arrival information.

6. The digital broadcasting receiver of claim 4, wherein the main controller detects a moving speed of the digital broadcasting receiver, calculates an expected time to return to the destination by using the exceeding distance and the detected moving speed, and generates the expected time as the destination arrival information.

7. The digital broadcasting receiver of claim 1, wherein the data comprises data transmitted from a satellite and relayed by a relay.

8. A method of notifying destination arrival information by a digital broadcasting receiver storing information of locations of gap fillers and information of corresponding gap filler identifiers matched to the locations, wherein the gap fillers are arranged at regular intervals, the method comprising:

inputting a destination;

detecting identification information of a destination gap filler corresponding to the input destination;

receiving data including the identification information of the destination gap filler corresponding to the input destination;

detecting identification information of a current gap filler from the data;

counting the number of gap fillers located between the destination gap filler and the current gap filler by using the identification information of the destination gap filler and the identification information of the current gap filler; and outputting the destination arrival information based on the counted the number of gap fillers.

9. The method of claim 8, wherein, in outputting the destination arrival information, the counted number of gap fillers is compared with a reference number of gap fillers for the arrival, and arrival at the destination or passage of the destination is provided in advance when the counted number of gap fillers is less than or more than the reference number of gap fillers.

10. The method of claim 9, wherein the outputting of the destination arrival information comprises:

calculating the number of bus stops or subway stations remaining before the destination or passed by after the destination by using the counted number of the gap fillers; and outputting the number of remaining/passed bus stops or remaining/passed subway stations as the destination arrival information when the number of remaining/passed bus stops or remaining/passed subway stations is less than or more than the reference number for arrival.

11. The method of claim 8, wherein the outputting of the destination arrival information comprises:

calculating a remaining distance to the destination or an exceeding distance beyond the destination by using the counted number of gap fillers and the regular interval between the gap fillers; and outputting the remaining distance or the exceeding distance.

12. The method of claim 11, wherein the outputting of the destination arrival information comprises:

calculating a remaining distance to the destination by multiplying the counted number of gap fillers by the regular interval between the gap fillers;

detecting a moving speed of the digital broadcasting receiver;

calculating expected time to reach the destination by using the calculated remaining distance and the detected moving speed; and outputting the expected time.

13. The method of claim 11, wherein the outputting of the destination arrival information comprises:

calculating an exceeding distance beyond the destination by multiplying the counted number of gap fillers by the regular interval between the gap fillers;

detecting a moving speed of the digital broadcasting receiver;

calculating exceeding time after the destination by using the calculated exceeding distance and the detected moving speed; and outputting the exceeding time.

14. The method of claim 8, wherein the data comprises data transmitted from a satellite and relayed by a relay.

* * * * *